(12) United States Patent
Ben-Zedeff et al.

(10) Patent No.: US 8,483,044 B2
(45) Date of Patent: Jul. 9, 2013

(54) SYSTEMS, METHODS, AND MEDIA FOR IDENTIFYING DEGRADED VIDEO CALL LINKS

(75) Inventors: Sagee Ben-Zedeff, Givataim (IL); Yair Wiener, Qiryat Ono (IL)

(73) Assignee: Radvision Ltd., Tel-Aviv (IL)

( * ) Notice: Subject to any disclaimer, the term of this patent is extended or adjusted under 35 U.S.C. 154(b) by 281 days.

(21) Appl. No.: 13/151,065

(22) Filed: Jun. 1, 2011

(65) Prior Publication Data

US 2012/0306990 A1    Dec. 6, 2012

(51) Int. Cl.
    *G01R 31/08*    (2006.01)
(52) U.S. Cl.
    USPC ............ 370/216; 348/14.08; 348/14.12; 370/217; 370/225; 370/242; 370/351; 709/224
(58) Field of Classification Search
    USPC ........... 348/14.01–14.16, 125, 126, 129–138, 348/180, 192–194; 370/216–228, 241–253, 370/259–271, 351–357; 709/201–207, 217–248
    See application file for complete search history.

(56) References Cited

U.S. PATENT DOCUMENTS

| | | | |
|---|---|---|---|
| 2004/0165526 A1* | 8/2004 | Yada et al. | 370/228 |
| 2006/0190620 A1* | 8/2006 | Kobayashi | 709/242 |
| 2008/0037443 A1 | 2/2008 | Ansari et al. | |
| 2010/0053300 A1 | 3/2010 | Einarsson et al. | |
| 2010/0100768 A1* | 4/2010 | Yamamoto et al. | 714/32 |
| 2011/0069138 A1 | 3/2011 | Ali et al. | |

FOREIGN PATENT DOCUMENTS

WO    WO2011045736 A1    4/2011

OTHER PUBLICATIONS

International Search Report, PCT/IB2012/002005, Feb. 22, 2013, 47 pages.

* cited by examiner

*Primary Examiner* — Hemant Patel

(57) ABSTRACT

Systems, methods, and media for identifying degraded video call links are provided. In some embodiments, systems for identifying degraded video call links are provided, the systems comprising: at least one hardware processor that: calculates network metrics and quality metrics of a video call stream received at a device through a first link and then through a second link; determines whether a network problem is present in the video call stream based on the network metrics; determines whether a quality problem is present in the video call stream based on the quality metrics; and determines that the second link is degraded if both a network problem and a quality problem are determined to be present, and determines that the first link is degraded if a quality problem is determined to be present but a network problem is not determined to be present.

28 Claims, 4 Drawing Sheets

| Network Element 2 | | Receiver | | Error Location |
|---|---|---|---|---|
| Network Problem | Quality Problem | Network Problem | Quality Problem | |
| N | Y | N | Y | Link 1 |
| N | Y | Y | Y | Link 1 & Link 4 |
| Y | Y | N | Y | Link 2 |
| Y | Y | Y | Y | Link 2 & Link 4 |
| N | N | Y | Y | Link 4 |
| N | N | N | Y | Link 3 |

| Network Element 2 | | Receiver | | Error Location |
|---|---|---|---|---|
| Network Problem | Quality Problem | Network Problem | Quality Problem | |
| N | Y | N | Y | Link 1 |
| N | Y | Y | Y | Link 1 & Link 4 |
| Y | Y | N | Y | Link 2 |
| Y | Y | Y | Y | Link 2 & Link 4 |
| N | N | Y | Y | Link 4 |
| N | N | N | Y | Link 3 |

400

US 8,483,044 B2

SYSTEMS, METHODS, AND MEDIA FOR IDENTIFYING DEGRADED VIDEO CALL LINKS

TECHNICAL FIELD

The disclosed subject matter relates to systems, methods, and media for identifying degraded video call links.

BACKGROUND

Video calling systems are continuing to increase in popularity and usage. Such systems, which previously had been only available to corporate users, are now available to ordinary consumers. Such systems can be used to conduct video calls, video conference calls, video chats, etc. (collectively, hereinafter "video calls") between parties in the same community or around the world.

Video calling systems typically include two or more endpoints and one or more links between the endpoints that allow streams of video and/or audio to be communicated between the endpoints. These endpoints can include personal computers, mobile phones, video conferencing system endpoints, etc. These links can include portions of local area networks, wide area networks, the Internet, etc.

From time to time, while conducting a video call, a stream forming the call or a portion of the call can suffer quality problems. For example, such quality problems can include excessive packet loss, inadequate bit rates, inadequate resolution, video blockiness, video visual artifacts, video smearing, and/or any other quality problems. These problems in a link can be caused, for example, by the link itself or a device driving the link.

In order to correct such problems, it is desirable to be able to determine where the problems are occurring. For example, when there are two or more links between a pair of endpoints involved in a video call, it is desirable to identify one or more of the links (including a device driving the link) as causing the problems. In this way, once a degraded link is identified, steps can be taken to correct any issues on the degraded link.

SUMMARY

Systems, methods, and media for identifying degraded video call links are provided. In some embodiments, systems for identifying degraded video call links are provided, the systems comprising: at least one hardware processor that: calculates network metrics and quality metrics of a video call stream received at a device through a first link and then through a second link; determines whether a network problem is present in the video call stream based on the network metrics; determines whether a quality problem is present in the video call stream based on the quality metrics; and determines that the second link is degraded if both a network problem and a quality problem are determined to be present, and determines that the first link is degraded if a quality problem is determined to be present but a network problem is not determined to be present.

In some embodiments, methods for identifying degraded video call links are provided, the methods comprising: calculating network metrics and quality metrics of a video call stream received at a device through a first link and then through a second link; determining whether a network problem is present in the video call stream based on the network metrics; determining whether a quality problem is present in the video call stream based on the quality metrics; and determining that the second link is degraded if both a network problem and a quality problem are determined to be present, and determining that the first link is degraded if a quality problem is determined to be present but a network problem is not determined to be present.

In some embodiments, non-transitory computer-readable media containing computer-executable instructions that, when executed by a processor, cause the processor to perform a method for identifying degraded video call links are provided, the method comprising: calculating network metrics and quality metrics of a video call stream received at a device through a first link and then through a second link; determining whether a network problem is present in the video call stream based on the network metrics; determining whether a quality problem is present in the video call stream based on the quality metrics; and determining that the second link is degraded if both a network problem and a quality problem are determined to be present, and determining that the first link is degraded if a quality problem is determined to be present but a network problem is not determined to be present.

BRIEF DESCRIPTION OF THE DRAWINGS

FIG. 4 is a table for identifying one or more degraded links in a video call based on the presence of network problems and/or quality problems at a network element and a receiver in accordance with some embodiments.

DETAILED DESCRIPTION

Systems, methods, and media for identifying degraded video call links are provided.

In accordance with some embodiments, mechanisms for locating a degraded link in a multi-link connection between two parties in a video call are provided.

In some embodiments, a call between two parties (each using a call endpoint) is routed through one or more network elements. These network elements can be network-aware routers that may change the video stream using packet manipulation, Multipoint Conferencing Units (MCUs) that perform re-encoding of the video stream, video Gateways that perform routing and/or transcoding), logo insertion servers, and/or any other suitable network elements capable of changing a video stream (e.g., by performing "transcoding").

In the case of a problem with the perceived video quality at the receiving end, it is desirable to be able to locate the cause of the problem so that the problem can be solved. For example, in the case of a video call between two endpoints via a first link, a network element, and a second link, it is desirable to be able to determine in which of the links (or a device driving one of the links) the problem exists.

Figure 1:
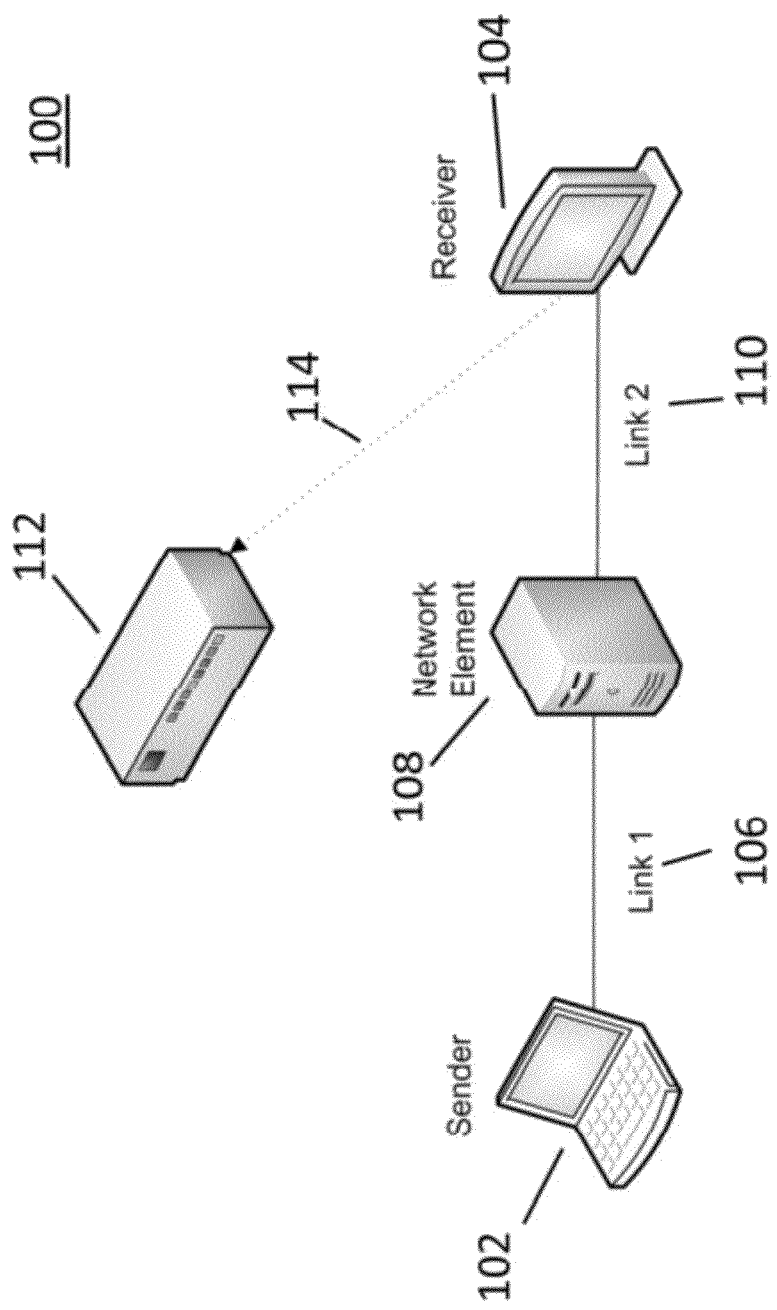
FIG. 1 is a diagram of a video calling system having two links in accordance with some embodiments.

For example, FIG. 1 illustrates an example configuration 100 for a video call. As shown, this configuration can include two endpoints 102 and 104, a first link 106, a network element 108, and a second link 110. In this configuration, a sender at endpoint 102 can be sending video through network element 108 to a receiver at endpoint 104. First link 106 connects sender endpoint 102 and network element 108, and second link 110 connects network element 108 and receiver endpoint 104. Although endpoint 102 is identified as a "sender" endpoint and endpoint 104 is identified as a "receiver" endpoint for the purposes of illustration, these endpoints can additionally receive video and send video, respectively, in some embodiments.

In order to facilitate determining in which of links 106 and 110 a problem exists, receiver endpoint 104 can calculate metrics based on a received video call stream. These metrics can include: network metrics that relate to the objective quality of the stream (for example, packet loss rate, bit rate, resolution, and/or any other suitable metric) and quality metrics that relate to the perceived quality of the stream (for example, blockiness, visual artifacts, smearing, and/or any other suitable metric). These metrics can then be processed by any suitable device to determine where a problem exists. For example, in some embodiments, these metrics can be processed by receiver endpoint 104 to determine the location of any degraded links. As another example, in some embodiments, an external network device 112 can receive these metrics via a link 114 and provide an analysis of the metrics to determine the location of any degraded links.

Figure 2:
FIG. 2 is a table for identifying a degraded link in a video call based on the presence of network problems and/or quality problems at a receiver in accordance with some embodiments.

In accordance with some embodiments, the cause of the problems in the video stream can be determined based on the metrics using a table, such as table 200 of FIG. 2. As shown, if quality problems occur without any network problems between network element 108 and second link 110, then the error can be determined to be located in first link 106. If there are network problems, then the error can be determined to be located in second link 110.

In accordance with some embodiments, the technique described above can be expanded to the general case of n links. With n links, there will be (n−1) network elements. The receiver and (n−1)/2 of these network elements can be used to calculate metrics based on a received video call stream. The receiver, an external network device, a network element, and/or any other suitable device can evaluate these metrics in order to determine the source of a problem in the received video stream.

Figure 3:
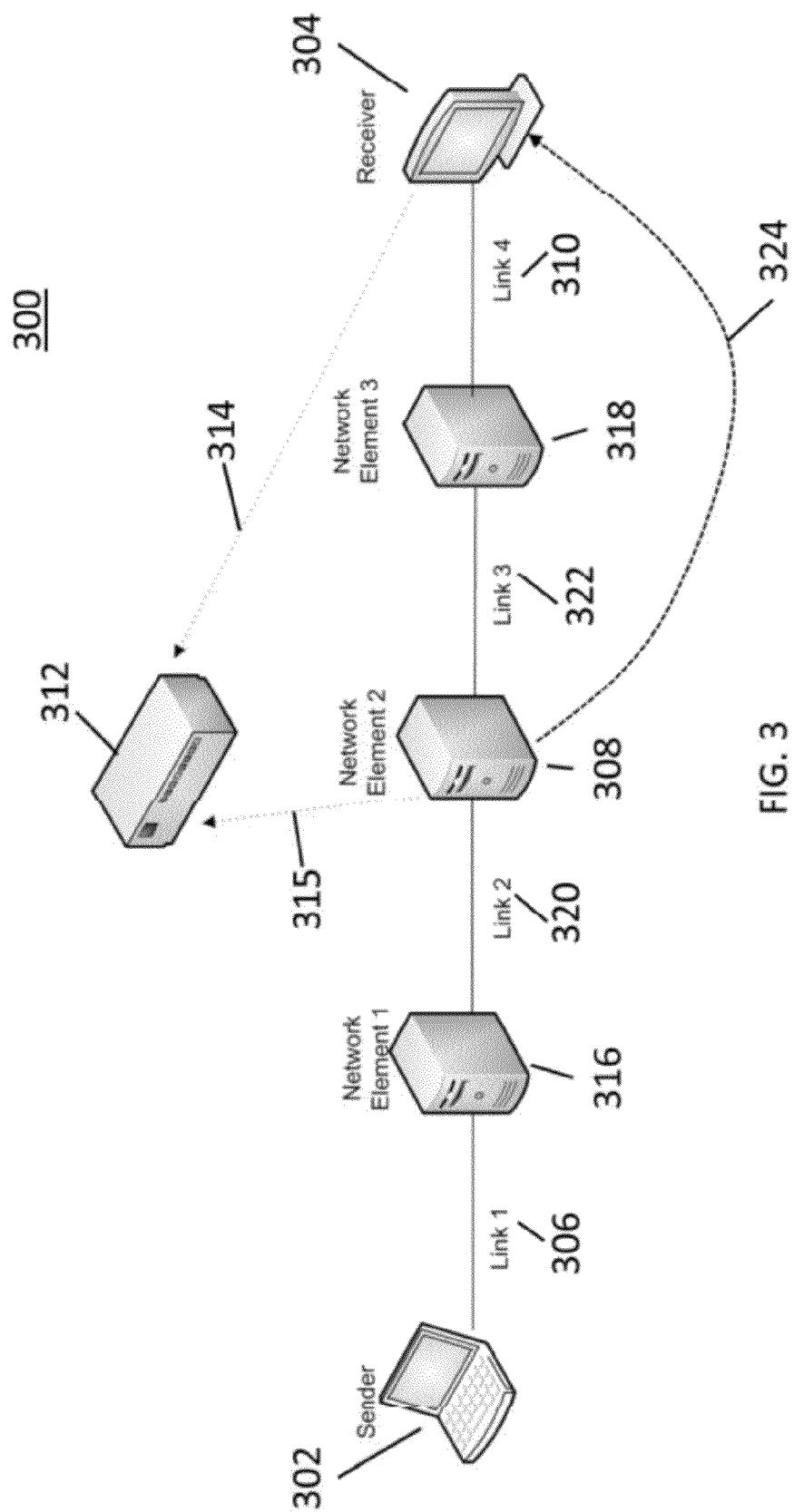
FIG. 3 is a diagram of a video calling system having four links in accordance with some embodiments.

For example as illustrated in FIG. 3, in the case of four links 306, 320, 322, and 310, there will be three network elements 316, 308, and 318, and network element 308 and the receiver can be used to calculate metrics based on a received video call stream. Each device calculating metrics (e.g., network element 308 and receiver 304) can provide information regarding the link before it (e.g.: for network element 308, link 320; and for receiver 304, link 310) as well as information regarding the link before the link before the device (e.g.: for network element 308, link 306; and for receiver 304, link 322). The calculated metrics can then be provided to an external device 312 via links 314 and 315, provided to receiver 304 via link 324, and/or provided to any other suitable device, and the degraded links identified.

In some embodiments, degraded links can be identified using a table such as table 400 of FIG. 4. As illustrated, if the stream received at network element 308 is determined based on the metrics to not have a network problem but have a quality problem, and if the stream received at receiver 304 is determined based on the metrics to also not have a network problem, but have a quality problem, then link 1 306 can be identified as being a degraded link.

Similarly, in accordance with some embodiments, such mechanisms can be extended to make determinations for any number n of links by calculating metrics from (n−1)/2 of these links.)

In accordance with some embodiments, an endpoint or endpoints can be any suitable hardware and/or software for implementing a video conferencing endpoint, and an endpoint can be any suitable device or part of any suitable device. For example, an endpoint can be a general purpose computer that is configured using special software to act as a video conferencing endpoint.

In accordance with some embodiments, endpoints, network elements, and/or network devices can be implemented in one or more general purpose devices such as a computer or a special purpose device such as a client, a server, etc. Any of these general or special purpose devices can include any suitable components such as a hardware processor (which can be a microprocessor, digital signal processor, a controller, etc.), memory, communication interfaces, display controllers, input devices, etc., and can be configured to operate in response to software instructions consistent with the functionality described herein.

In accordance with some embodiments, links can include the Internet (or a portion thereof), a wired network (or a portion thereof), a wireless network (or a portion thereof), a local area network (or a portion thereof), a wide area network (or a portion thereof), a telephone network (or a portion thereof), a cable network (or a portion thereof), a satellite network (or a portion thereof), a fiber optic network (or a portion thereof), routers, firewalls, servers, proxy servers, gateways, etc.

In some embodiments, any suitable computer readable media can be used for storing instructions for performing the processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A system for identifying degraded video call links, comprising:
at least one hardware processor that:
calculates network metrics and quality metrics of a video call stream received at a device through a first link and then through a second link;
determines whether a network problem is present in the video call stream based on the network metrics;
determines whether a quality problem is present in the video call stream based on the quality metrics; and
determines that the second link is degraded if both a network problem and a quality problem are determined to be present, and determines that the first link is degraded if a quality problem is determined to be present but a network problem is not determined to be present.

2. The system of claim 1, wherein the at least one hardware processor comprises two hardware processors, and a first of the two hardware processors calculates network metrics and quality metrics, and a second of the two hardware processors determines whether the second link or the first link is degraded.

3. The system of claim 1, wherein the device is a receiver endpoint.

4. The system of claim 1, wherein the device is a network element.

5. The system of claim 1, wherein the network metrics measure packet loss rate.

6. The system of claim 1, wherein the network metrics measure bit rate.

7. The system of claim 1, wherein the network metrics measure resolution.

8. The system of claim 1, wherein the quality metrics measure blockiness.

9. The system of claim 1, wherein the quality metrics measure visual artifacts.

10. The system of claim 1, wherein the quality metrics measure smearing.

11. A method for identifying degraded video call links, comprising:
    calculating network metrics and quality metrics of a video call stream received at a device through a first link and then through a second link;
    determining whether a network problem is present in the video call stream based on the network metrics;
    determining whether a quality problem is present in the video call stream based on the quality metrics; and
    determining that the second link is degraded if both a network problem and a quality problem are determined to be present, and determining that the first link is degraded if a quality problem is determined to be present but a network problem is not determined to be present.

12. The method of claim 11, wherein the device is a receiver endpoint.

13. The method of claim 11, wherein the device is a network element.

14. The method of claim 11, wherein the network metrics measure packet loss rate.

15. The method of claim 11, wherein the network metrics measure bit rate.

16. The method of claim 11, wherein the network metrics measure resolution.

17. The method of claim 11, wherein the quality metrics measure blockiness.

18. The method of claim 11, wherein the quality metrics measure visual artifacts.

19. The method of claim 11, wherein the quality metrics measure smearing.

20. A non-transitory computer-readable medium containing computer-executable instructions that, when executed by a processor, cause the processor to perform a method for identifying degraded video call links, the method comprising:
    calculating network metrics and quality metrics of a video call stream received at a device through a first link and then through a second link;
    determining whether a network problem is present in the video call stream based on the network metrics;
    determining whether a quality problem is present in the video call stream based on the quality metrics; and
    determining that the second link is degraded if both a network problem and a quality problem are determined to be present, and determining that the first link is degraded if a quality problem is determined to be present but a network problem is not determined to be present.

21. The non-transitory computer-readable medium of claim 20, wherein the device is a receiver endpoint.

22. The non-transitory computer-readable medium of claim 20, wherein the device is a network element.

23. The non-transitory computer-readable medium of claim 20, wherein the network metrics measure packet loss rate.

24. The non-transitory computer-readable medium of claim 20, wherein the network metrics measure bit rate.

25. The non-transitory computer-readable medium of claim 20, wherein the network metrics measure resolution.

26. The non-transitory computer-readable medium of claim 20, wherein the quality metrics measure blockiness.

27. The non-transitory computer-readable medium of claim 20, wherein the quality metrics measure visual artifacts.

28. The non-transitory computer-readable medium of claim 20, wherein the quality metrics measure smearing.

* * * * *